United States Patent Office 3,276,908
Patented Oct. 4, 1966

3,276,908
PROCESS FOR REMOVING ASH AND MINERAL COMPONENTS FROM DEXTROSE LIQUOR
Leo R. Idaszak, Oak Lawn, Ill., assignor to Corn Products Company, New York, N.Y., a corporation of Delaware
No Drawing. Filed Jan. 6, 1964, Ser. No. 336,034
2 Claims. (Cl. 127—40)

This invention relates to the manufacture of dextrose liquors. More particularly, this invention relates to the use of electrodialysis to remove ash and mineral components from dextrose liquors.

The electrodialysis of aqueous solutions is effected in multi-membrane demineralizers having alternating diluting and concentrating chambers with spaced alternating cation and anion permselective membranes therebetween defining the diluting and concentrating solutions, respectively.

When solutions of organic substances are subjected to electrodialysis, water as a dilute electrolyte (0.02 N NaCl) is commonly used as the concentrate stream. This method has three major disadvantages. Valuable non-ionic components in the dialysate (product) stream such as sugar, diffuse through the membranes into the concentrate stream because of concentration gradients. This diffusion represents a loss of valuable material. A second disadvantage of this method is that water is transferred from the concentrate stream to the dialysate stream because of the concentration gradient. This water transfer is a "true" dilution and is not a result of decreased dry substance concentration because of diffusional dry substance losses. This water dilution represents an additional operating expense in terms of evaporating costs. The third disadvantage of the conventional method of operating an electrodialysis process is that internal leakage within the electrodialysis unit, which can occur accidentally, could result in additional loss of valuable material and/or additional water dilution.

I have eliminated the three disadvantages listed above by using the same liquid on both sides of the electrodialysis membrane. I have referred to this as the liquor-liquor system to distinguish from the conventional liquor-water system. According to my method, a given process stream is divided into two basic component streams for electrodialysis—the disalysate stream and the concentrate stream. Electrical energy is used to transfer ionic ash and mineral components from the dialysate stream to the concentrate stream. Since I am concerned primarily with removing ash from dextrose liquors, I have referred to the dialysate stream as the product stream.

The process of my invention comprises taking a tap or branch stream from a main dextrose liquor stream, splitting this branch stream into two sub-streams, one of which in passing through the electrodialyzer cells becomes enriched in ash, the other of which becomes depleted of ash. The ash-enriched sub-stream (herein termed the concentrate stream) is conducted back to the main dextrose stream or processed to make a salable product and the second sub-stream of reduced ash content (herein termed the product stream) is processed to produce a dextrose syrup of low ash and mineral content.

The process of my invention is illustrated by the following example.

A stream of a crystallizer supply liquor obtained from the acid-enzyme conversion of starch and having a Brix of 57° (30° Bé.) was divided into two streams and passed through an electrodialyzer cell. The dextrose liquor had an iron content of 15 p.p.m. D.B. before electrodialysis and the product stream after electrodialysis had an iron content of less than 4 p.p.m. The product stream was passed to evaporators for processing in the usual manner to make a low-ash dextrose and the concentrate stream was returned to the main dextrose syrup stream.

My process is applicable to any ash-containing dextrose liquor (e.g. first or second greens, crystallizer supply liquor or blends of liquors) which is free of insoluble materials which would tend to plug the small solution passages in the electrodialysis unit. It is preferable to use liquors having a concentration of approximately 55% D.S. or 30° Bé. since this concentration results in the highest deashing rate, thus permitting a given amount of product to be processed with the smallest amount of electrodialysis equipment. It is advisable to avoid extremely high concentrations; e.g. at 37° Bé. there are problems in physically getting material through the electrodialysis unit because of viscosity problems.

Table I shows that the percent of deashing increases with increasing voltage and decreasing dry substance. Although the percent deashing increases with decreasing dry substance, the actual ash removal, i.e., pounds of ash removed, is less because the total ash present decreases with decreasing dry substance.

TABLE I
*Deashing of sugar liquor*

|  | Dry Substance, percent | Cell Pair, volts | | | | | |
|---|---|---|---|---|---|---|---|
|  |  | 5.05 | | 3.28 | | 1.54 | |
|  |  | Average Deashing, percent | Ash[a] Removed, lb. | Average Deashing, percent | Ash[a] Removed, lb. | Average Deashing, percent | Ash[a] Removed, lb. |
| Liquor-Liquor | 55 | 89.3 | 0.0207 | 79.3 | 0.0184 | 67.8 | 0.0157 |
|  | 40 | 89.9 | 0.014 | 86.8 | 0.0135 | 85.1 | 0.0117 |
|  | 20 | 99 | 0.00711 | 94.9 | 0.00683 | 92.4 | 0.00665 |
| Liquor-Water | 55 | 88.2 | 0.0204 | 81.8 | 0.0190 | 78.6 | 0.0182 |

[a] Based on a supply volume of 1 gallon, ash content 0.4 percent D.B.

The operating temperature of the electrodialysis unit is governed by the temperature limitations of the membranes. At the present time, the most satisfactory temperatures for operating commercially available membranes is about 110° F.

I have also found that by subjecting mother liquor from a dextrose crystallization process to electrodialysis, two grades of hydrol may be produced. Hydrol from an acid-enzyme conversion of starch to dextrose contains approximately 2 percent ash and hydrol from the conventional acid process for hydrolysis of starch to dextrose contains up to 8 percent ash. By subjecting the hydrol to electrodialysis, a low ash dextrose product may be produced (less than 0.5% ash) and the concentrate stream may be processed in accordance with the usual practice in the crystalline dextrose process to produce a product having an ash content of about 7%.

Use of electrodialysis before refining may improve refining efficiency with corresponding decrease in amount of refining agent used. Although electrodialysis is not considered a refining operation, there is an improvement in the quality (color, clarity, protein content) of the product stream. This increase in product stream quality is accompanied by a decrease in the concentrate stream quality.

By using the dextrose liquor on both sides of the electrodialysis membrane in accordance with the process of my invention, there is no transfer of water or dextrose through the membranes. This is a great improvement over the usual liquor-water system wherein there is a transfer of dextrose when applied to dextrose liquors and water as shown in Table II.

TABLE II

*Summary of dextrose and water transfer*

| Liquor ᵃ Composition | Dextrose Transfer, g. dextrose/g. equiv. ash transferred | Fraction Dextrose Transferred, g. dextrose/ g. dextrose processed | Water Transfer, liter H₂O/ g. equiv. ash transferred |
| --- | --- | --- | --- |
| Second Greens | 37.5 | 0.014 | 0.396 |
| Do | 32.3 | 0.014 | 0.372 |
| First Greens | 111.0 | 0.0191 | 0.805 |
| Do | 100.0 | 0.0181 | 0.785 |
| Crystallizer Supply Liquor | 68.9 | 0.0005 | 1.39 |

ᵃ All 30° Bé. liquors used for dialysate stream, water (0.02 N NaCl used for concentrate stream.

I claim:

1. A process for removing ash and mineral components from dextrose liquor comprising dividing a dextrose liquor having a concentration of about 55% dry substance into two streams, passing one of said streams through an electrodialyzer cell on one side of a semi-permeable electrodialysis membrane and simultaneously passing the other stream on the other side of the membrane, said membrane permitting only the passage of ions from one stream to the other, recovering the ion-depleted stream as a dextrose product stream depleted of ash and removing the other dextrose stream enriched in ash for further processing.

2. A process for removing ash and mineral components from dextrose liquor comprising dividing the mother liquor obtained from a dextrose crystallization process and having a dry substance concentration of about 55% and an ash content, dry basis, of about 0.5% to about 8.0%, into two streams, passing one of said streams through an electrodialyzer cell on one side of a semi-permeable electrodialysis membrane and simultaneously passing the other stream on the other side of the membrane, said membrane permitting only the passage of ions from one stream to the other, removing the resulting dextrose product stream as a low ash liquid dextrose product, and removing the other dextrose stream enriched in ash for further processing.

References Cited by the Examiner

UNITED STATES PATENTS 2,393,095  1/1946  Fetzer _____ 127—40
2,860,091  11/1958  Rosenberg _____ 204—180 X

FOREIGN PATENTS 302,375  12/1928  Great Britain.

MORRIS O. WOLK, *Primary Examiner.*

MICHAEL E. ROGERS, *Examiner.*